United States Patent [19]

Helfand et al.

[11] 4,440,914

[45] Apr. 3, 1984

[54] SOLID EPOXY RESIN SYSTEMS

[75] Inventors: David Helfand, Yorktown Heights, N.Y.; Ralph F. Sellers, Somerset, N.J.

[73] Assignee: Ciba-Geigy Corporation, Ardsley, N.Y.

[21] Appl. No.: 419,663

[22] Filed: Sep. 20, 1982

Related U.S. Application Data

[63] Continuation-in-part of Ser. No. 312,600, Oct. 19, 1981, abandoned.

[51] Int. Cl.$^3$ ............................................. C08G 59/38
[52] U.S. Cl. .................................... 525/482; 525/485; 525/486
[58] Field of Search ...................... 525/482, 485, 486; 528/98, 103

[56] References Cited

U.S. PATENT DOCUMENTS

| | | | |
|---|---|---|---|
| 3,100,756 | 8/1963 | Fry | 260/30.4 |
| 3,367,990 | 2/1968 | Bremmer | 525/482 |
| 3,452,116 | 6/1969 | Schwarzer | 260/830 |
| 3,488,404 | 1/1970 | Parker | 525/482 |
| 4,169,187 | 9/1979 | Glazar | 525/482 X |
| 4,288,565 | 9/1981 | Lohse et al. | 521/135 |

FOREIGN PATENT DOCUMENTS

| | | |
|---|---|---|
| 2505345 | 8/1975 | Fed. Rep. of Germany . |
| 2055843 | 3/1981 | United Kingdom . |

OTHER PUBLICATIONS

Lee & Neville, *Handbook of Epoxy Resins*, McGraw-Hill, New York, 1967, pp. 11–15.

*Primary Examiner*—Earl A. Nielsen
*Attorney, Agent, or Firm*—Harry Falber

[57] ABSTRACT

Solid epoxy resin systems comprising the reaction products of a polyepoxide compound with a functionality greater than two, a diglycidyl ether of a polyhydric phenol and a polyhydric phenol; said systems being applicable for use in a variety of applications and particularly in combination with phenolic novolac hardeners for molding applications.

17 Claims, No Drawings

SOLID EPOXY RESIN SYSTEMS

RELATED APPLICATIONS

This application is a continuation-in-part of application Ser. No. 312,600, filed Oct. 19, 1981, now abandoned.

Various solid epoxy resins have been developed which can be made to satisfy a wide range of properties, such as softening point and melt viscosity, in order to improve the selection and augment the capabilities of epoxy resins available to molding formulations and end users. Among the solid epoxy resins used in the manufacture of molding grade compounds are included difunctional resins based on advancement products of bisphenol A diglycidyl ethers, or various multifunctional resins such as epoxy phenol novolacs, epoxy cresol novolacs, tri-glycidyl isocyanurate and tetra-[glycidyl p-hydroxyphenyl] ethane.

Resin choice depends partly upon several processing considerations amongst which are ease of handling, amount and type of flow during molding and cure rate. Cured properties such as glass transition temperature, moisture absorption and resistance to thermal and mechanical stress also affect resin choice. It has been determined that the multifunctional resins are superior to the difunctional resins in molding applications both in terms of pre- and post-cured properties. Functionalities greater than two are desirable since they enhance the formation of a crosslink network during curing. Such superiority is primarily evidenced in thermal properties and electrical properties at elevated temperatures. Correspondingly, physical blends of multifunctional and difunctional resins exhibit performance characteristics which are inferior to those of the pure multifunctional resin, such differences being once again primarily observed in thermal performance characteristics.

Although it may thus be reasoned that multifunctional resins are the logical choice for such areas of application, there are a number of instances where this reasoning does not follow. For example, solid multifunctional resins in many cases provide performance characteristics well in excess of that which is required for a given application. Since these resins are expensive in comparision to solid bisphenol A based epoxies, their use in such instances is uneconomical. Accordingly, the beneficial properties that could be provided by such resins are sacrificed by practitioners who may opt not to use the resins in view of the unfavorable cost factors.

It is also to be noted that the multifunctional resins exhibit various disadvantages. Thus, they exhibit restricted flow and viscosity characteristics. Subsequent to curing, these resin-based formulations exhibit extensive brittleness as evidenced by reduced tensile elongation and higher flexural and tensile moduli. Such brittleness is a distinct detriment when, for example, the resins are utilized as encapsulants. Finally, these resins exhibit moisture absorption characteristics which still could be improved upon. The water absorption of an encapsulant, for example, is a most important characteristic since it is known that device failure by corrosion can be caused by the reaction of various ionic species, hydrolyzable chlorine, and other substances present in the molding compound with small amount of water.

Accordingly, it is the primary object of this invention to provide modified solid epoxy resin systems having processing characteristics and cured properties at least comparable to those of pure multifunctional resins.

It is a further object to reduce the level of multifunctional resin in these systems without adversely effecting the performance characteristics thereof.

It is another object to provide solid epoxy reaction products which improve upon the processing characteristics and flexibility of multifunctional resins.

Further objects and advantages of this invention will become apparent from the following descriptive material and illustrative examples.

It has now been surprisingly discovered that by reacting a polyepoxide compound having a functionality greater than two with a diglycidyl ether of a polyhydric phenol and a polyhydric phenol, it is possible to retain most and improve upon other properties of the multifunctional resin while still being able to reduce the content of said multifunctional resin in the system by about 10–40%. These systems facilitate great flexibility in terms of achieving optimum softening points and melt viscosities for the desired end use. Correspondingly, the degree of grindability of the resin system can be readily adjusted to meet the practitioner's specific needs. These properties thus enable the resin systems to be tailored for specific applications.

Similar performance benefits are obtained when the resin system is formulated with a phenol novolac hardener and various other ingredients to prepare molding compounds. Although 10–40% of expensive multifunctional resin is eliminated, the resulting system substantially maintains the thermal and mechanical properties of molding systems based solely on multifunctional resin. The maintenance of such thermal properties, including thermal stability, heat deflection, thermal coefficient of expansion, retention of electrical properties, and the like, is evidenced by glass transition temperatures comparable to those of the multifunctional resin systems. Furthermore, performance improvements in the molding formulations are noted in properties such as flexibility, tensile elongation and moisture absorption. Thus, the instant systems provide greater percentages of tensile elongation and lower flexural and tensile moduli. They demonstrate superior water moisture resistance which can be expected to minimize corrosion problems and the like which can be encountered.

Accordingly, it is seen that the instant systems provide the benefits of a pure multifunctional resin system without incurring the adverse economic factors associated therewith. These modified systems are available for use in a broad range of molding applications such, for example, in the encapsulation of semi-conductor devices. They also find use in the manufacture of powder coatings, reinforced articles, and the like.

Applicable multifunctional resins of functionality greater than two correspond to the formula

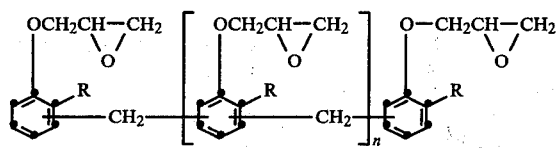

wherein R is hydrogen or methyl, and n is about 0.2–6.0. These components are exemplified by the epoxidation products of cresol novolacs and phenol novolacs of varying molecular weight with cresol novolacs being preferred. The preparation of such materials is well known in the art. Likewise, such materials are commercially available.

In addition, the tetra-glycidyl ether of tetra [hydroxyphenyl] ethane is applicable as the multifunctional resin to prepare appropriate solid resins suitable for molding applications. This material is commercially available.

It is also to be noted that multifunctional resins such as tetra-glycidylated methylene dianiline, tri-glycidylated p-amino-phenol, tri-glycidyl isocyanurate and tri-glycidyl ether of tris-(hydroxyphenyl)methane may have corresponding applicability.

Among the applicable diglycidyl ethers of polyhydric phenols are included those corresponding to the formula

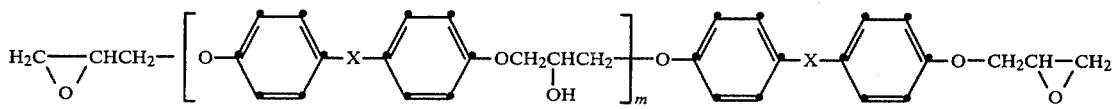

wherein m is 0–50 and X is —CH$_2$—,

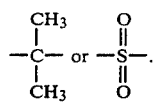

These represent, respectively, bisphenols F, A and S. Other applicable ethers include the diglycidyl ethers of resorcinol, catechol, hydroquinone, and the like. The various ethers may be substituted on the respective phenyl rings by such non-reactive substituents as alkyl, halogen, and the like. The diglycidyl ether of bisphenol A and the tetra-brominated derivative thereof are preferred for purposes of this invention.

The polyhydric phenol functions primarily to adjust the softening point, melt viscosity and degree of grindability of the resin system. Applicable phenols include the phenols noted in the above description of the diglycidylated ethers absent, of course, the glycidyl ether groups. Bisphenol A and the tetra-brominated derivative thereof are preferred for purposes of this invention.

The epoxy-containing components of the instant systems will generally be present in concentrations ranging from 60–90% of multifunctional resin and 10–40% of diglycidyl ether, and preferably 65–75% of multifunctional resin and 25–35% of diglycidyl ether. The polyhydric phenol will be present in concentrations ranging from 2 to 23%, based on the total weight of epoxy-containing components, and preferably 5 to 12%. As previously noted, the amount of polyhydric phenol will help determine the basic properties of the resin systems. It is essential that the selection of the specific amount of polyhydric phenol within the noted range for any particular system be based on the components of the system and on the need to avoid premature gelling of the resin components.

The reaction procedure, i.e. advancement reaction, is well known to those skilled in the art and generally involves the reaction of the multifunctional resin, diglycidyl ether and polyhydric phenol in the presence of an advancing catalyst or accelerator. Typical accelerators include alkali metal hydroxides, imidazoles, phosphonium compounds, and the like. The specific choice of catalyst will depend on the intended end use application. In order to facilitate the initial blending operation, it is preferred to warm the multifunctional resin and diglycidyl ether to about 80°–100° C. and then to add the dihydric phenol. Stirring at this point provides a clear melt blend. The catalyst is then added and the temperature is raised to 140°–180° C. to effect the advancement reaction. The progress of the reaction can be monitored by titration of the epoxide groups using samples taken during the reaction. Completion of the reaction will generally take 1 to 6 hours to provide resin systems having epoxy values in the range of 0.2–0.5 epoxy equivalents per 100 grams of resin.

The resulting advanced resins are solid and will generally having a softening point range of 60°–95° C., a melt viscosity range of 700–15,000 centipoises at 130° C. and, as previously noted, an epoxy value range of 0.2–0.5 epoxy equivalents per 100 grams of resin.

Depending upon the desired end use application, the resin will be formulated with the appropriate ingredients and combined with the appropriate hardener and accelerator components. For the primary area of utility of the instant resin systems as molding compounds, novolac hardeners are utilized. Such hardeners can include phenol or cresol novolacs as defined under the multifunctional resins absent the epoxy groups. Such novolacs are known and are widely used in the manufacture of encapsulant systems. The hardener is utilized in concentrations ranging from about 25 to 40%, by weight of the total advanced resin.

The resin-hardener systems can furthermore be mixed, prior to cure, with usual modifiers such as extenders, fillers and reinforcing agents, pigments, dyestuffs, plasticizers, diluents, accelerators, and the like. As extenders, reinforcing agents, fillers and pigments which can be employed in the curable systems according to the invention there may be mentioned, for example: coal tar, bitumen, glass fibers, boron fibers, carbon fibers, cellulose, polyethylene powder, polypropylene powder, mica, asbestos, various quartz powders, fused silicas, silicates, silanes, magnesium and calcium carbonates, gypsum, bentones, silica aerogel ("Aerosil"), lithopone, barite, titanium dioxide, carbon black, graphite, iron oxide, or metal powders such as aluminum power or iron powder. It is also possible to add other usual additives, for example, flameproofing agents such as antimony trioxide, agents for conferring thixotropy, flow control agents such as silicones, cellulose acetate butyrate, polyvinyl butyral waxes, stearates and the like (which are in part also used as mold release agents) to the curable systems. The accelerators that are added may be identical to the advancement catalysts or may additionally include boron trifluoride monoethylamine complexes, tertiary amines, and the like.

The end products can be manufactured in the usual manner with the aid of known mixing equipment (kneaders, extruders, rollers, and the like). For purposes of preparing molding compositions, one satisfactory approach involves utilizing heated two roll mills, wherein the resin system and the hardener system are separately combined with filler and milled and the resulting phases are ground to the desired size and then blended.

Curing will generally be conducted at temperatures ranging from 140° to 185° C. The expression "cure", as used herein, denotes the conversion of the above systems into insoluble and infusible crosslinked products, with simultaneous shaping to give shaped articles such as moldings, pressings or laminates, or to give two-dimensional structures such as coatings, enamels or adhesive bonds.

Although major emphasis has been placed on the use of the instant resin systems for molding compounds, it is to be noted that they likewise may be utilized for the preparation of powder coatings, reinforced articles (substrates), and the like. In these other areas of use, it is possible to utilize additional hardeners such as dicyandiamide, polyesters, anhydrides, aromatic amines, and the like. The benefits derived in powder coating formulations include chemical and thermal resistance. Typical powder coating formulations include the resin, hardener, accelerator, pigment and flow agent. Preparation and application of such powder coatings are known to those skilled in the art.

The following examples will further illustrate the embodiments of the instant invention. In these examples, all parts given are by weight unless otherwise noted.

EXAMPLE I

This example illustrates the preparation of a typical resin system of this invention.

The following components were utilized:

| Formulation A | Parts |
|---|---|
| Epoxy cresol novolac (1) | 70 |
| Diglycidyl ether of bisphenol A (2) | 30 |
| Bisphenol A | 11 |

(1) ECN 1280 from CIBA-GEIGY Corp. epoxy value-0.44 eq./100 g. softening point-82° C. viscosity at 130° C.-5709 cps.
(2) ARALDITE 6010 from CIBA-GEIGY Corp.

The epoxy cresol novolac and the diglycidyl ether were blended and warmed to 80° C. to provide a uniform mix. The bisphenol A was then admixed to form a clear melt blend. Thereafter, 40 ppm of 2-phenyl imidazole catalyst were added, the temperature was raised to 160° C. and the advancement allowed to continue for a period of 3 hours. The resulting solid epoxy resin system was determined to have an epoxy value of 0.34 per 100 grams with a softening point of 80° C. and a melt viscosity of 10,700 centipoises at 130° C.

EXAMPLE II

The following resin systems were prepared according to the procedure of Example I.

| | parts | | | | | |
|---|---|---|---|---|---|---|
| | B | C | D | E | F | G |
| Epoxy cresol novolac (1) | — | 60 | 80 | — | — | — |
| Epoxy cresol novolac (3) | 70 | — | — | — | — | — |
| Epoxy cresol novolac (4) | — | — | — | 75 | — | — |
| Epoxy phenol novolac (5) | — | — | — | — | 75 | — |
| Tetraglycidyl ether of tetra[p-hydroxyphenyl]ethane (6) | — | — | — | — | — | 70 |
| Diglycidyl ether of bisphenol A (2) | — | 40 | 20 | 25 | 25 | 30 |
| Diglycidyl ether of bisphenol A (7) | 30 | — | — | — | — | — |
| Bisphenol A | 9 | 15 | 8 | 22.3 | 22.3 | 8 |

(3) ECN 1273 from CIBA-GEIGY Corp. epoxy value-0.46 eq./100 g. softening point-73° C. viscosity at 130° C.-1938 cps.
(4) ECN 1235 from CIBA-GEIGY Corp. epoxy value-0.47 eq./100 g. viscous liquid at R.T.
(5) EPN 1138 from CIBA-GEIGY Corp. epoxy value-0.56 eq./100 g. viscous liquid at R.T.
(6) ARALDITE 0163 from CIBA-GEIGY Corp. epoxy value-0.55 eq./100 g. softening point-60° C.
(7) DER 331 from Dow Chemical Corp.

These resin systems exhibited following characteristics:

| Formulation | Epoxy Value/100 g. | Softening Pt. (°C.) |
|---|---|---|
| B | 0.37 | 75 |
| C | 0.30 | 91 |
| D | 0.35 | 90–91 |
| E | 0 24 | 83 |
| F | 0.30 | 85 |
| G | 0.41 | 72.5 |

EXAMPLE III

This example illustrates the preparation of molding compounds utilizing the resins systems of this invention. The following formulations were prepared:

| | parts | | | | | | | |
|---|---|---|---|---|---|---|---|---|
| | 1 | 2 | 3 | 4 | 5 | 6 | 7 | 8 |
| Resin A | 100 | — | — | — | — | — | 100 | — |
| Resin B | — | 100 | — | — | — | — | — | — |
| Resin C | — | — | 100 | — | — | — | — | — |
| Resin D | — | — | — | 100 | — | — | — | — |
| Resin E | — | — | — | — | 100 | — | — | — |
| Resin F | — | — | — | — | — | 100 | — | — |
| Resin G | — | — | — | — | — | — | — | 100 |
| Novolac hardener (8) | 30 | 33 | 27.6 | 32.2 | 21.8 | 27.3 | 30.7 | 37.3 |
| Wax (release agent) | 1 | 1 | 1 | 1 | 1 | 1 | 1 | 1 |
| Imidazole (accelerator) | 1 | 1 | 1 | 1 | 1 | 1 | 1 | 1 |
| Silica filler (9) | 244 | 249 | 241 | 249 | 230 | 240 | 246 | 258.7 |

(8) BRWE 5833 (solid phenol-novolac having 1 OH group/100g.) from Union Carbide
(9) NOVACITE 325 from Malvern Minerals Corp.

In each instance, the molding compounds were prepared by a two component hot two roll mill method. The first phase involved blending the resin components with 65 weight % of the filler and hot two rolling the blend at 85°–100° C. The second phase involved blending the remaining filler with accelerator, hardener and release agent and hot two rolling the blend at 95°–100° C. The phases were then separately subjected to size reduction by hammer milling and uniformly combined by ball milling in proper proportions at room temperature to form the complete molding compound formulation.

Correspondingly, control systems reflecting pure multifunctional resin and physical blends of multifunctional resin and glycidylated dihydric phenol were prepared by grinding all the components and then combining them in the desired proportions using a ball mill. These control systems are as follows:

|  | Parts | | | | | |
|---|---|---|---|---|---|---|
|  | 9 | 10 | 11 | 12 | 13 | 14 |
| Epoxy cresol novolac (1) | 100 | 75 | 50 | 25 | — | — |
| Tetraglycidyl ether (6) | — | — | — | — | — | 100 |
| Diglycidylated ether of bisphenol A | — | 25 | 50 | 75 | 100 | — |
| Novolac hardener (4) | 40 | 34.6 | 29.1 | 23.6 | 18.2 | 50.0 |
| Imidazole | 1 | 1 | 1 | 1 | 1 | 1 |
| Wax | 1 | 1 | 1 | 1 | 1 | 1 |
| Filler (9) | 264 | 254 | 243 | 233 | 223 | 282.3 |

The instant systems and the control system were then subjected to the various test procedures.

GLASS TRANSITION TEMPERATURE

Specimens for this test were prepared by transfer molding of the sample and then post-curing for 4 hours at 175° C. The glass transition temperature determinations were made by thermo-mechanical analysis in the expansion mode and gave the following results:

| # | Glass Transition Temp. (°C.) |
|---|---|
| 1 | 151 |
| 2 | 149 |
| 3 | 137 |
| 4 | 144 |
| 5 | 115 |
| 6 | 130 |
| 7 | 147 |
| 8 | 152 |
| 9 | 147 |
| 10 | 140 |
| 11 | 132 |
| 12 | 123 |
| 13 | 110 |
| 14 | 147 |

It is seen that in most instances, the glass transition temperatures of the instant systems are comparable to those of the multifunctional resins (#8 and #14) indicating a retention of the beneficial thermal characteristics of the multifunctional resin despite a reduction in the concentration thereof. It is also important to note that a substantially equal percentage of multifunctional resin gives a higher glass transition temperature when used in the resin advancement formulation (#1) than when used in the resin blend (#10).

PHYSICAL/MECHANICAL PROPERTIES

Flexural, tensile as well as tensile elongation data for the various systems were obtained at room temperature according to ASTM test methods D-790 and D-638, respectively. Heat deflection temperatures (HDT) were determined by ASTM-D-648. The results are noted hereinbelow:

|  | #1 | #2 | #9 |
|---|---|---|---|
| Flexural Strength (psi) | 12,000 | 13,800 | 12,860 |
| Flexural Modulus (psi) | $1.4 \times 10^5$ | $1.6 \times 10^5$ | $1.7 \times 10^6$ |
| Tensile Strength (psi) | 10,160 | 9,268 | 8,300 |
| Tensile Modulus (psi) | $1.5 \times 10^6$ | $1.5 \times 10^6$ | $1.6 \times 10^6$ |
| Tensile Elongation (%) | 0.70 | 0.70 | 0.59 |
| HDT (°C.) | 201 | 201 | 203 |

The similiarity in most values provides further indication that the resin systems of the instant invention provide comparable mechanical properties to systems based on pure multifunctional resin. It is important to note, however, that the respective values for room temperature flexural modulus and room temperature % tensile elongation provide a clear indication that the instant systems show improved flexibility and elongation characteristics.

MOISTURE ABSORPTION

Molded samples were weighed, subjected to the conditions noted in the following table and then reweighed in order to determine moisture absorption.

|  | Percent Weight Increase | | | |
|---|---|---|---|---|
| Test Condition | #1 | #2 | #9 | #13 |
| 24 hr. complete immersion at R.T. | 0.05 | 0.04 | 0.04 | 0.06 |
| 48 hr. complete immersion at 50° C. | 0.27 | 0.29 | 0.32 | 0.33 |
| 24 hr. in steam at 121° C. and 15 psig | 1.42 | 1.31 | 1.52 | 1.51 |

Once again, it is to be noted that the instant systems show improved performance characteristics in an important variable. Thus, the controls #9 and #13 exhibit increased moisture absorption, particularly at the more severe test conditions.

Summarizing, it is seen that this invention provides novel solid epoxy resin systems which exhibit excellent performance characteristics. Variations may be made in proportions, procedures and materials without departing from the scope of the invention as defined by the following claims.

What is claimed is:

1. A solid advanced epoxy resin comprising the reaction product resulting from a catalyzed advancement reaction of (a) a polyepoxide resin having a functionality greater than two, said resin (1) corresponding to the formula

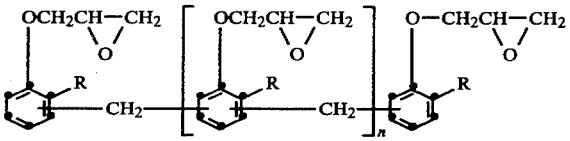

wherein R is H or CH₃ and n is about 0.2–6.0, or (2) being the tetraglycidyl ether of tetra[hydroxyphenyl)ethane;

(b) a diglycidyl ether of a polyhydric phenol or the alkyl or halogen derivatives thereof; and (c) a polyhydric phenol or the alkyl or halogen derivatives thereof;

components (a) and (b) being present in concentration ranges of from 60–90%, by weight, and 10–40%, by weight, respectively, and component (c) being present in a concentration range of 2 to 23%, based on the total weight of components (a) and (b).

2. The resin product of claim 1, wherein component (a) is the epoxidation product of cresol novolacs.

3. The resin product of claim 1, wherein component (a) is the tetraglycidyl ether of tetra[hydroxyphenyl]ethane.

4. The resin product of claim 1, wherein component (b) is selected from the group consisting of diglycidyl ethers of bisphenols corresponding to the formula

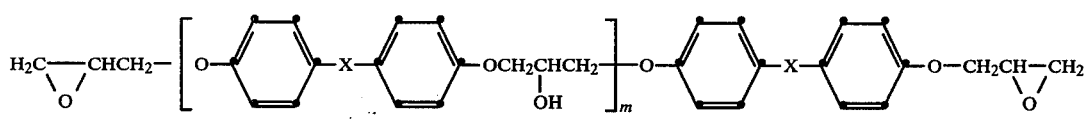

wherein m is 0-50 and X is —CH$_2$,

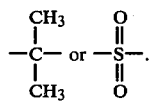

5. The resin product of claims 2 or 3, wherein component (b) in the diglycidyl ether of bisphenol A.

6. The resin product of claim 1, wherein component (c) is bisphenol F, A or S.

7. The resin product of claim 5, wherein component (c) is bisphenol A.

8. The resin product of claim 1, wherein component (a) is present in a concentration of 65-75%, by weight.

9. The resin product of claim 6, wherein component (c) is present in a concentration of 5-12%, based on the total weight of components (a) and (b).

10. The resin product of claim 1 comprising the reaction product of 70 parts epoxy cresol novolac, 30 parts of the diglycidylated ether of bisphenol A and 11 parts of bisphenol A, all parts being by weight.

11. The resin product of claim 1 comprising the reaction product of 70 parts epoxy cresol novolac, 30 parts of the diglycidylated ether of bisphenol A and 9 parts of bisphenol A, all parts being by weight.

12. The resin product of claim 1 comprising the reaction product of 70 parts of the tetraglycidyl ether of tetra[hydroxyphenyl]ethane, 30 parts of the diglycidylated ether of bisphenol A and 8 parts of bisphenol A, all parts being by weight.

13. A heat curable composition which comprises the resin product of either of claims 1, 10, 11 or 12 and a hardener therefor.

14. The cured product obtained from the elevated temperature curing of the curable mixture of claim 13.

15. A molding composition comprising a resin product of either claims 1, 10, 11 or 12, an inert filler material, a novolac hardener and a curing accelerator.

16. The molding composition of claim 15, wherein said novolac hardener is a phenol novolac hardener.

17. The cured molding composition obtained from the elevated temperature curing of the molding composition of claim 15.

* * * * *